No. 690,970. Patented Jan. 14, 1902.
E. LEWIS.
STEEL TRAP.
(Application filed Sept. 24, 1901.)
(No Model.)

Witnesses
J. P. Britt
Harry Ellis Chandlee

Inventor
E. Lewis,
By Chandlee & Chandlee
Attorneys

UNITED STATES PATENT OFFICE.

ELMER LEWIS, OF SACO, MONTANA.

STEEL TRAP.

SPECIFICATION forming part of Letters Patent No. 690,970, dated January 14, 1902.

Application filed September 24, 1901. Serial No. 76,373. (No model.)

*To all whom it may concern:*

Be it known that I, ELMER LEWIS, a citizen of the United States, residing at Saco, in the county of Valley, State of Montana, have invented certain new and useful Improvements in Steel Traps; and I do hereby declare the following to be a full, clear, and exact description of the invention, such as will enable others skilled in the art to which it appertains to make and use the same.

This invention relates to traps in general, and more particularly to steel traps; and it has for its object to provide a device of this nature which may be made in different sizes for different kinds of animals and which when sprung will catch the animal by the neck, thus holding him most securely.

A further object of the invention is to provide a construction which will be simple and cheap of manufacture and which will be most efficient in its operation.

Figure 1:
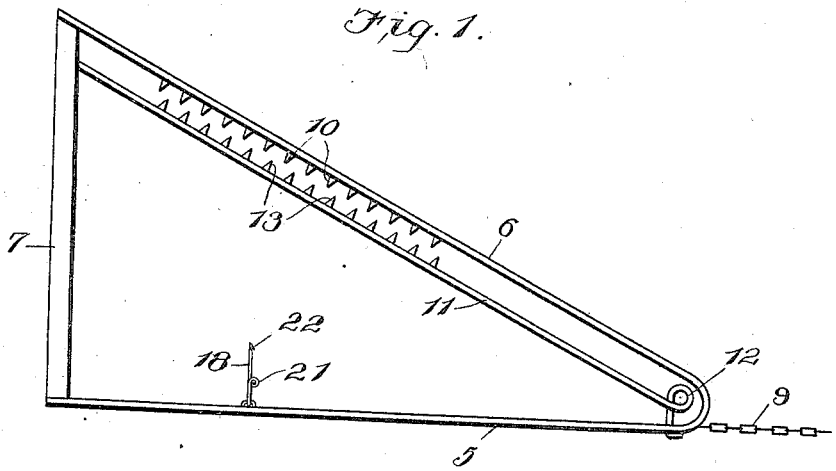
Figure 2:
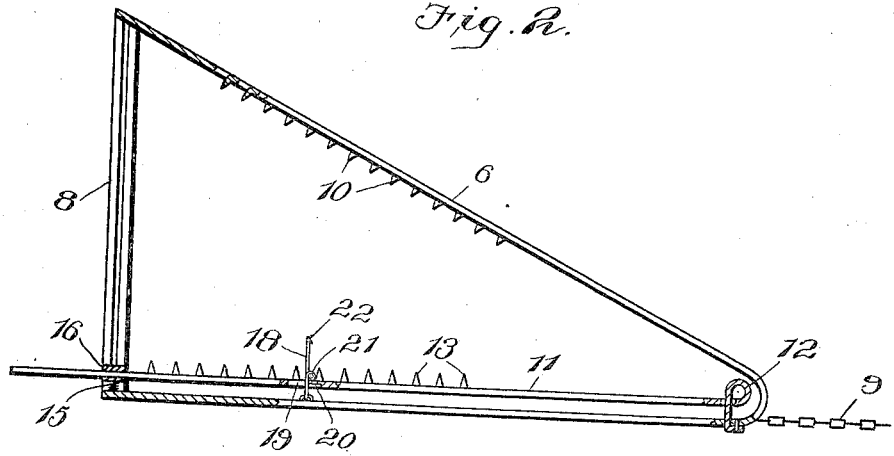

In the drawings forming a portion of this specification, and in which like numerals of reference indicate similar parts in both views, Figure 1 is a side elevation showing the trap sprung. Fig. 2 is a vertical section of the trap, parts thereof being in elevation and showing the trap set.

Referring now to the drawings, the trap consists of a metallic plate comprising a base member 5 and an inclined member 6, lying at an acute angle to each other, and connecting the free ends of which are the vertical spaced rods 7 and 8. At the angle of the two members 5 and 6 is connected a chain 9, by means of which the trap may be secured to a stake or other fixed anchorage. The member 6 is provided with downwardly-directed teeth 10, punched from the metal thereof, the member 6 forming the upper fixed jaw of the trap.

The lower movable jaw of the trap is formed of a plate 11, of spring metal, one end of which is much more pliable than the remaining portion of the plate and is bent to form a coil-spring 12, the extreme end of the plate being passed through a perforation in the base 5 and riveted securely. The outer or free end of the movable jaw is passed between the upright rods 7 and 8, between which it has a vertical movement, the metal of the movable jaw being struck up to form teeth 13, which when the jaw moves upwardly are brought toward the teeth of the fixed jaw to coöperate therewith to hold an animal. To assist the coil-spring at the fixed end of the movable jaw, a helical spring 15 is provided, the lower end thereof being attached to the member 5 between the rods 7 and 8, while the upper end thereof is attached to a block 16, mounted slidably between the rods and through which the free end of the movable jaw is passed. The helical spring by forcing the block upwardly raises the jaw, and when the jaw is depressed it is against the tendency of this helical spring. To hold the movable jaw in lowered or retracted position, a latch is provided and consists of a wire 18, which is pivoted at its lower end to the member 5 and is taken upwardly and through an opening 19 in the jaw 11 when the latter is depressed, the jaw 11 having a tongue 20 projecting into the opening for engagement under the loop 21, formed in the latch, the latch having a hook 22 at its upper end to receive a bait. When an animal attempts to take the bait, the latch is moved to disengage the loop from the tongue, and the lower jaw is released and rises to catch the animal between it and the upper jaw.

In practice modifications of the specific construction shown may be made and any suitable materials and proportions may be used for the various parts without departing from the spirit of the invention.

What is claimed is—

1. A steel trap consisting of a metallic plate bent to form two convergent members, one of which is provided with teeth, a second plate having a spring formed at one end and attached to a member of the first plate, the second plate having teeth for coöperation with the teeth of the first plate, and a latch pivoted to the first plate and constructed and arranged for engagement with the second plate to hold it against the tendency of its spring, said latch being extended through the second plate and adapted for attachment of bait thereto.

2. A steel trap comprising a plate bent to form diverging members, one of which is provided with teeth, spaced rods connected with the free ends of the members, a second plate having flexible connection with a member of the first plate and provided with teeth for cooperation with the teeth of the first plate, a helical spring connecting the plates and arranged to move the second plate toward the teeth of the first plate, and a bait-latch constructed and arranged to engage the second plate and hold it retracted.

In testimony whereof I affix my signature in presence of two witnesses.

ELMER LEWIS.

Witnesses:
HARRY A. VAGG,
A. A. BIRUM.